(12) United States Patent
Qureshi et al.

(10) Patent No.: US 7,496,740 B2
(45) Date of Patent: Feb. 24, 2009

(54) ACCESSING INFORMATION ASSOCIATED WITH AN ADVANCED CONFIGURATION AND POWER INTERFACE ENVIRONMENT

(75) Inventors: Shiraz Ali Qureshi, Rocklin, CA (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 10/899,394

(22) Filed: Jul. 26, 2004

(65) Prior Publication Data

US 2006/0020834 A1  Jan. 26, 2006

(51) Int. Cl.
*G06F 13/10* (2006.01)
*G06F 15/177* (2006.01)
(52) U.S. Cl. .............. 713/1; 713/2; 713/100; 713/300; 713/310; 713/320; 713/321; 713/322; 713/323; 713/324; 713/330; 713/340; 711/113
(58) Field of Classification Search ............... 713/1, 713/2, 100, 300, 310, 320–324, 330, 340; 711/113
See application file for complete search history.

(56) References Cited

U.S. PATENT DOCUMENTS

| 5,903,894 | A  | * | 5/1999  | Reneris ............... 707/100 |
| 6,182,194 | B1 | * | 1/2001  | Uemura et al. ........... 711/133 |
| 6,282,644 | B1 | * | 8/2001  | Ko ........................... 713/2 |
| 6,453,423 | B1 |   | 9/2002  | Loison |
| 6,587,966 | B1 |   | 7/2003  | Chaiken et al. |
| 6,654,896 | B1 |   | 11/2003 | Saunders et al. |
| 2002/0147719 | A1 | * | 10/2002 | Zhang et al. .............. 707/9 |
| 2003/0204710 | A1 | * | 10/2003 | Culter et al. .............. 713/1 |
| 2003/0217299 | A1 |   | 11/2003 | Neuman et al. |
| 2004/0044914 | A1 | * | 3/2004  | Gedeon .................. 713/300 |
| 2004/0216137 | A1 | * | 10/2004 | Warwick et al. ......... 719/318 |
| 2005/0138636 | A1 | * | 6/2005  | Achtelstetter ........... 719/315 |
| 2005/0144486 | A1 | * | 6/2005  | Komarla et al. ......... 713/300 |

OTHER PUBLICATIONS

"The buffer cache", The Linux System Administrator's Guide: Version 0.7, Chapter 7. Memory Management, http://www.faqs.org/docs/linux_admin/buffer-cache.html, retrieved on May 2, 2007.*

* cited by examiner

*Primary Examiner*—Thomas Lee
*Assistant Examiner*—Fahmida Rahman

(57) ABSTRACT

A computer system includes an operating system. An advanced configuration and power interface (ACPI) system is in communication with the operating system and receives an ACPI request from the operating system. A cache is in communication with the ACPI system and receives the ACPI request from the ACPI system and provides ACPI data to the operating system via the ACPI system.

24 Claims, 3 Drawing Sheets

ACCESSING INFORMATION ASSOCIATED WITH AN ADVANCED CONFIGURATION AND POWER INTERFACE ENVIRONMENT

BACKGROUND

The computer industry has developed a common interface for enabling robust operating system and power management (OSPM) of entire computer systems. The common interface definition and functionality manifests itself in the advanced configuration and power interface ACPI specification. The current version of the ACPI is Version 2 having a release date of Jul. 27, 2000, together with the ACPI Errata Version 1.3, Nov. 27, 2000, both of which are incorporated herein by reference for all purposes.

Computer systems employing ACPI perform configuration and power management functions using ACPI code or information. Specifically, ACPI code is used to determine platform-specific information regarding the particular hardware and/or software, for example, of a computer system. Once the configuration of the computer system has been determined, the ACPI code manages the power requirements of the various devices of the computer system.

ACPI code is stored in a portion of a memory component of a computer system known as ACPI namespace. An operating system of a computer system typically writes ACPI code into the ACPI namespace in a monolithic form. That is, ACPI code typically is written into memory as a single program that includes all of the ACPI functionality required for each device of the computer system. Typically, the ACPI code written into memory is in the form of a device tree, which identifies each of the devices of the computer system. The device tree also includes at least one functional routine for each of the identified devices.

SUMMARY

A computer system includes an operating system. An advanced configuration and power interface (ACPI) system is in communication with the operating system and receives an ACPI request from the operating system. A cache is in communication with the ACPI system and receives the ACPI request from the ACPI system and provides ACPI data to the operating system via the ACPI system.

DETAILED DESCRIPTION

Figure 1:
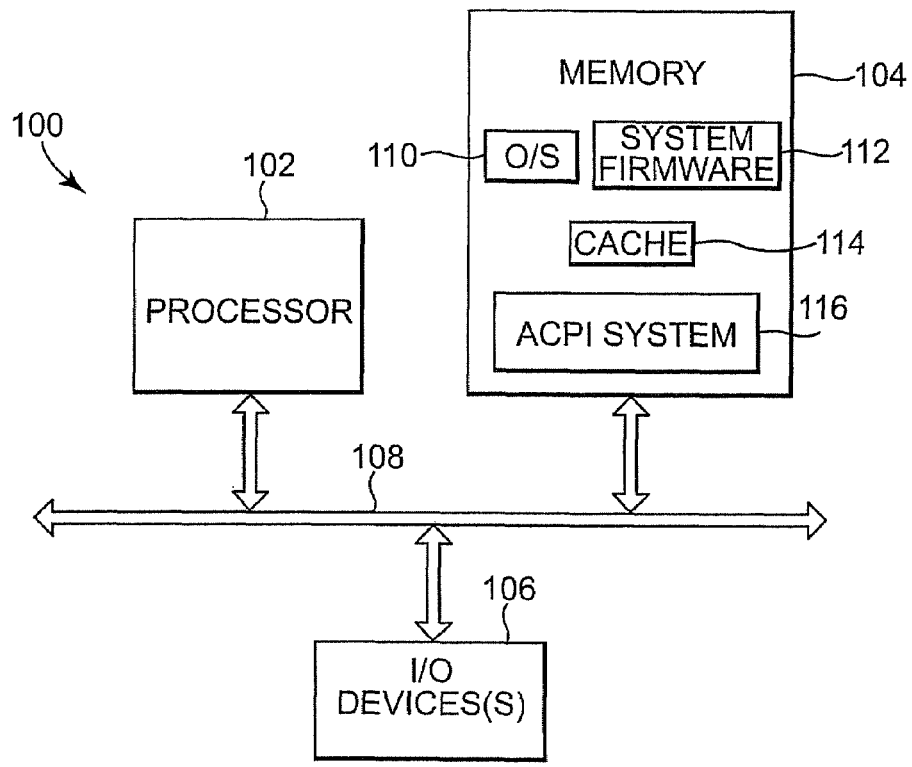
FIG. 1 is a schematic diagram illustrating one embodiment of a computer or process-based system including an advanced configuration and power interface (ACPI) system.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Prior art advanced configuration and power interface (ACPI) configurations can be problematic because there tends to be a lack of standardization of computer system configurations. In particular, various combinations of operating systems, hardware devices, and software applications are used in computer systems. Thus, ACPI code tends to lack standardization and can be somewhat complex as the embedded functional routines of the device tree can add significant length to the ACPI code. Due to the length of the ACPI code, the run time of the ACPI code can execute slower than is desirable. More specifically, repeatedly accessing the same or similar ACPI code or information from the ACPI namespace detrimentally increases the ACPI code run time to unacceptable levels within the ACPI community.

One embodiment of a system and method according to the present invention includes an operating system capable of accessing data, such as dynamic ACPI information or code, or intermediate data, in a manner that increases execution speed within a computer system.

Embodiments of ACPI methods and systems may be implemented in software, firmware, hardware, or combinations thereof. When implemented in hardware, embodiments of ACPI systems may be implemented with any or a combination of various technologies. For example, the following technologies, which are each well known in the art, may be used: a discrete logic circuit(s) having logic gates for implanting logic functions upon data signals; an application specific integrated circuit(s) (ASIC) having appropriate combinational logic gates; a programmable gate array(s) (PGA); and a field programmable gate array(s) (FPGA).

When implemented in software, embodiments of ACPI methods and systems may be stored on a computer-readable medium for use by, or in connection with, a computer-related system or method. A computer-readable medium may be configured from an electronic, magnetic, optical, or other physical device or means that may contain or store a computer program for use by, or in connection with, a computer-related system or method. An ACPI system may be embodied in the computer-readable medium for use by, or in connection with, an instruction execution system, apparatus, or device, such as a computer-based system, processing-containing system, or other system that may retrieve instructions from the instruction execution system, apparatus, or device and execute the instructions.

As used herein, a "computer-readable medium" may be any means that may store, communicate, propagate, or transport a program for use by, or in connection with, an instruction execution system, apparatus, or device. Thus, a computer-readable medium may be, for example, an electronic, magnetic, optical, electromagnetic, infrared, or semiconductor system, apparatus, device, or propagation medium. More specific examples of a computer-readable medium include, but are not limited to, the following: an electrical connection (electronic) having one or more wires, a portable computer disc (magnetic), a random access memory (RAM) (electronic), a read-only memory (ROM) (electronic), an erasable, programmable read-only memory (EPROM, EEPROM, or flash memory) (electronic), an optical fiber (optical), or a portable, compact disc read-only memory (CD-ROM) (optical). Note that the computer-readable medium may also be paper or other suitable medium upon which the program is printed, as the program could be electronically captured, via optical scanning of the paper or other medium. The program may then be compiled, interpreted, or otherwise processed in a suitable manner, if necessary, and stored in a computer memory.

In one embodiment of the present invention, when implemented in software, an ACPI system includes a program that is executable by a digital computer, an example of which is depicted schematically in FIG. 1. In FIG. 1, computer 100 includes processor 102, memory 104, and one or more input and/or output (I/O) devices 106 (or peripherals) that are communicatively coupled via local interface 108.

In one embodiment, processor 102 is a hardware device configured to execute software that is to be stored in memory 104. Memory 104 includes any combination of volatile memory elements and/or non-volatile memory elements. Memory 104 also has a distributed architecture, where various components are situated remote from one another, but can be accessed by processor 102.

In one embodiment, I/O device(s) 106 include input devices such as a keypad, output devices such as a display device and/or devices that are configured to communicate as both inputs and outputs such as a communication interface. These subcomponents are not shown in FIG. 1 for clarity purposes.

In one embodiment, memory 104 includes one or more separate programs, each of which comprises an ordered listing of executable instructions for implementing logical functions. Specifically, memory 104 may include operating system 110 and system firmware 112. System firmware 112 initializes and tests the hardware components during a start-up function, and also starts operating system 110 and supports the transfer of data among the hardware devices. Typically, system firmware 112 includes a ROM so that system firmware 112 may be executed when computer system 100 is activated. Also shown in memory 104 of FIG. 1 is cache 114 and ACPI system 116, each of which will be described in detail with reference to later figures.

Figure 2:
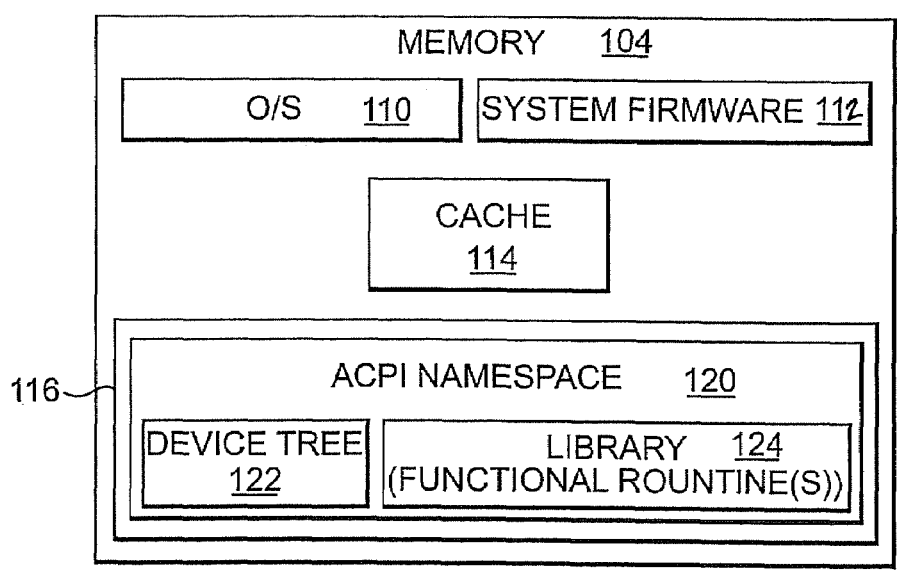
FIG. 2 is a schematic diagram illustrating one embodiment of a memory component of the system illustrated shown in FIG. 1.

As illustrated in FIG. 2, memory 104 includes operating system 110, system firmware 112, cache 114, and ACPI system 116. ACPI system 116 further includes ACPI namespace 120, device tree 122, and library function 124. Operating system 110 builds ACPI namespace 120, as well as the underlying functionality required for ACPI operations in accordance with known instructions, as is known in the art.

ACPI system 116 includes ACPI namespace 120, which further includes device tree 122 and library 124. Library 124 includes one or more routines, each of which provides functionality (e.g., ACPI functionality) that can be accessed by device tree 122. Specifically, the operating system 110 builds that portion of memory 104 designed as ACPI namespace 120 by interacting with device tree 122. As will be described in greater detail later, device tree 122 directs operating system 110 to access various routines of library 124 so that device-specific information may be provided to an appropriate location of ACPI namespace 120.

Cache 114 is a memory device or component, which contains or holds recently accessed data or code from ACPI namespace 120. When data or code is read from library 124 of ACPI namespace 120 to operation system 110 during a function call or request from operating system 110, a copy of the data or code is also saved in cache 114, along with the associated main memory address. In addition, intermediate data is stored within cache 114. Intermediate data is useful when the actual return value varies at run time, but there are intermediate results that do not vary at run time that can be reused to speed up the operation of an ACPI method. Cache 114 monitors addresses of subsequent ACPI function calls or request from operating system 110. If there is a cache hit and the requested information (data or ACPI code) is located within cache 114, this information is returned immediately to operating system 110 and an ACPI system read or function call is aborted (or not started). If the requested information (data or ACPI code) is not located within cache 114 (a cache miss), then the requested information is fetched or retrieved from ACPI system 116 and transferred to operating system 110, and also saved within cache 114.

Cache 114 is built from faster memory chips than those within ACPI system 116 so a cache hit takes much less time to complete than accessing ACPI system 116. The hit rate of cache 114 depends on the access pattern of the particular program being run (the sequence of addresses being read). In one embodiment, cache 114 relies on a temporal locality access pattern. A temporal locality access pattern is based upon the theory that if information (data or ACPI code) is accessed once, it is likely to be accessed again within a short amount of time. Therefore, in one embodiment, cache 114 concurrently stores the most recently accessed information from ACPI system 116. Once cache 114 is filled, the oldest information within cache 114 will be flushed from cache 114 and new information will be stored within cache 114. In another embodiment, cache 114 utilizes a spatial locality access pattern. A spatial locality access pattern follows the theory that if one memory location of ACPI system 116 is accessed, nearby memory locations within ACPI system 116 are also likely to be accessed. In order to exploit spatial locality, cache 114 may operate on caching several words at a time, also known as a cache line or a cache block.

Figure 3:
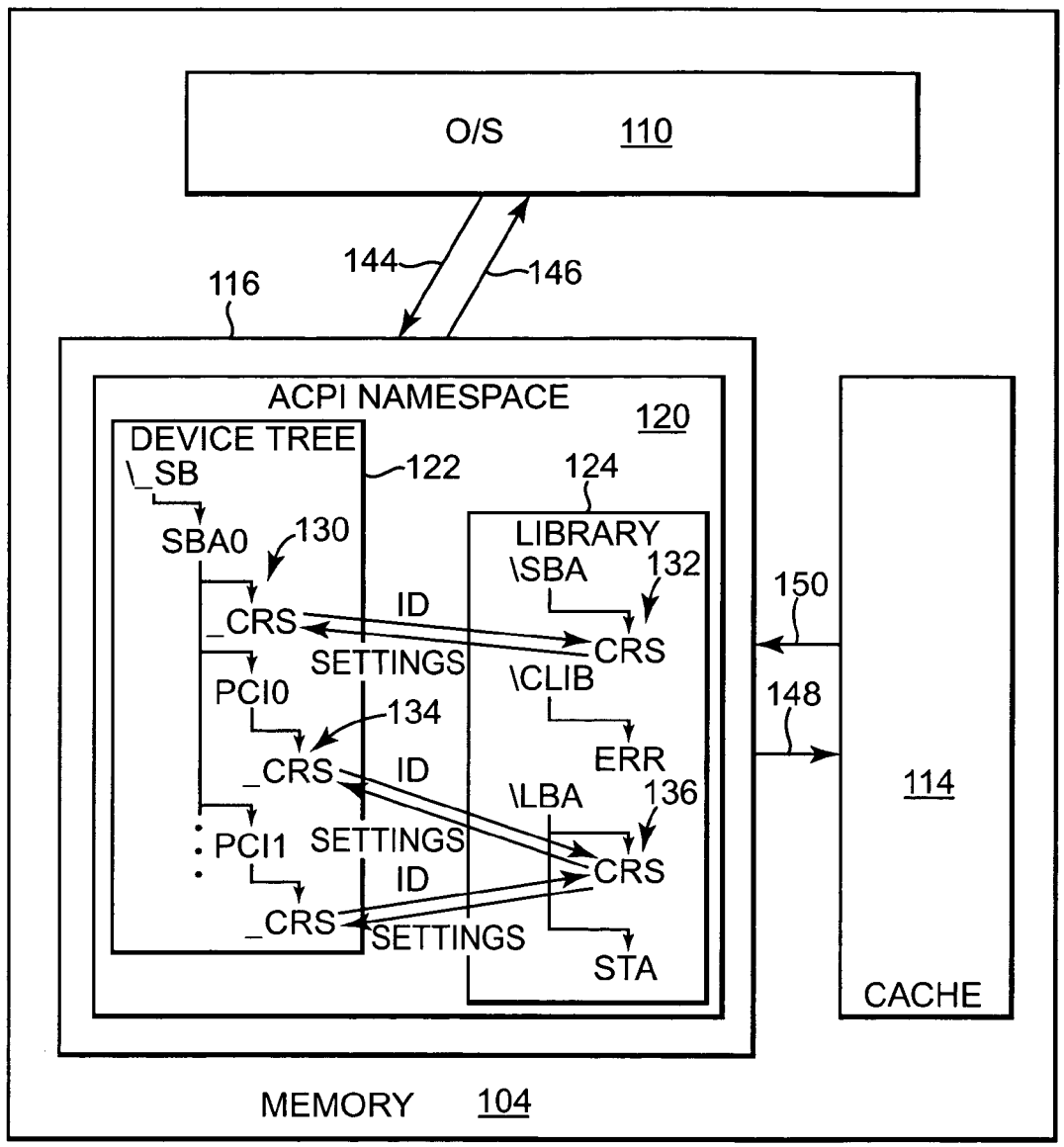
FIG. 3 is a schematic diagram illustrating one embodiment of a data or information transfers within a computer system.

One embodiment of a device tree and library of ACPI system 116 is illustrated schematically in FIG. 3. As illustrated in FIG. 3, ACPI namespace 120 of ACPI system 116 includes device tree 122 and library 124. Device tree 122 is in the form of a code structure, which describes the configuration of computer 100 with which device tree 122 is associated. In the portion of device tree 122 depicted in FIG. 3, a system bus_SB is provided. The system_SB includes system route bridge SBA0 as well as links to related devices and/or objects. Specifically, system route bridge SBA0 includes current resource setting object_CRS object, and system PCI host bridges PCI0 and PCI1. Note that each of the system PCI host bridges includes a link to a corresponding current resource setting.

Library 124 is illustrated in FIG. 3 as including multiple library routines, each of which includes functionality for one or more corresponding objects of device tree 122. Specifically, library 124 includes routines that can return information about objects in device tree 122.

In operation of one embodiment, the current resource setting routine \SBA.CRS routine 132 returns information about the current resource settings of the particular call object in device tree 122. The call object passes an identification number to the library routine to specify the particular object. In the case where current resource setting \SB.SBA0.CRS 130 is called in device tree 122, that code passes a unique device identification (ID) to library routine \SBA.CRS 132, passing the identification number of the caller. The library routine determines the correct values and then returns the values. Thus, library routine CRS 132 provides functionality that enables settings of the system route bridge SBA0 to be determined and provided for use in ACPI namespace 120. It is understood that the calls to library routines from device 122 typically are hard-coded direct calls. However, in some embodiments, indirect calls may be used. For example, a look-up table may be used.

As further illustrated in FIG. 3, when operating system 110 identifies an entry point associated with CRS 134 of system PCI host bridge PCI0, associated library routine CRS 136 is called. This includes passing a unique device identification (ID) to current resource setting CRS 136 so that current resource setting CRS 136 may return the corresponding device settings for PCI host bridge PCI0. It is understood that the control resource setting function associated with PCI host bridge PCI1 also uses library routine control resource setting CRS 136. Thus, multiple devices of device tree 122 utilize the same portion of the ACPI code of library 124 for providing the required functionality. Because of this, multiple instances of code may not need to be provided within a library for use with similar devices.

During operation of one embodiment, operating system 110 provides a function call or routine requesting information (data or ACPI code) to ACPI system 116 via communication line 144. ACPI system 110 then accesses cache 114 via communication 148. If the requested information or sufficient intermediate data is found within cache 114, the information is provided from cache 114 to operating system 110 via ACPI system 116 and communications 150 and 146. In the event that the requested information is not found within cache 114, the call continues. ACPI namespace 120 then retrieves the requested information from library 124 via device tree 122 and provides the requested information to operating system 110 via communication 146. The requested information is also provided to cache 114 via communication 148. Therefore, subsequent requests for the identical information may be fulfilled by cache 114, thereby increasing execution speed and reducing execution time of the function call or request. It is understood that communications 144, 146, 148, and 150 may be electrical, mechanical, or wireless communications.

Figure 4:
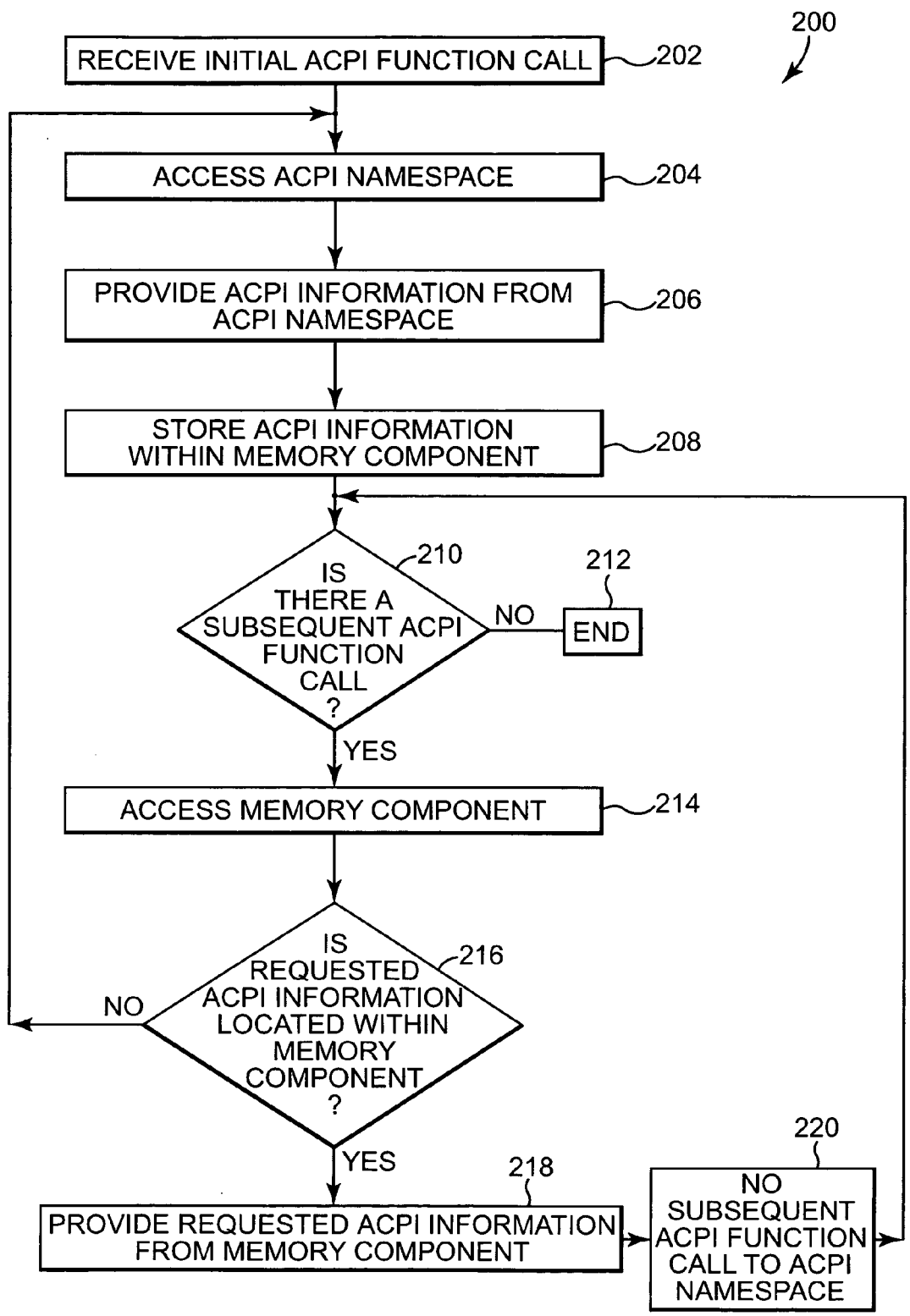
FIG. 4 is a flow chart illustrating one embodiment of a method of retrieving data or information in accordance with the present invention.

FIG. 4 illustrates flow chart 200 in accordance with one embodiment. Flow chart 200 further describes the methodology for accessing data associated with ACPI system 116 within computer 100 such that execution time is reduced. At step 202, ACPI system 116 receives an initial ACPI function call from operating system 110 via communication 144. At step 204, ACPI namespace 120 is accessed and device tree 122 in conjunction with library 124 identifies the location of the requested information. At step 206, the requested information is provided to operating system 110 via communication 146 from ACPI system 116 via ACPI namespace 120. At step 208, the requested ACPI information is stored within cache 114 via communication 148.

At decision step 210, computer 100 queries whether there is a subsequent ACPI function call. If there is no subsequent ACPI function call, then the method is ended, as shown at step 212. However, if there is a subsequent ACPI function call, then operating system 110 accesses cache 114 via APCI system 116 and communications 144 and 148, as shown at step 214. Cache 114 is then searched to determine if the requested ACPI information is located within cache 114. If the requested information is located within cache 114, then the requested ACPI information is provided from cache 114 to operating system 110 via ACPI system 116 and communications 150 and 146, as shown at step 218. At step 220, not subsequent ACPI function call is made to ACPI namespace 120. Therefore, execution time is minimized. Following the steps of providing ACPI information from cache 114 to operating system 110 via ACPI system 116 and communications 150 and 146 (step 218) and not accessing ACPI namespace 120 for the requested information (step 220), the system is again queried as to whether there is a subsequent ACPI function call, as shown at step 210, and the procedure continues.

If, at step 216, the requested ACPI information is not located within cache 114, then ACPI namespace 120 is accessed (step 204), the requested ACPI information is provided to operating system 110 from ACPI system 116 via communication 146 (step 206), and the requested ACPI information is stored within cache 114 via the communication 148 (step 208). The methodology then continues as previously described.

In one exemplary embodiment, steps 202-220 of method 200 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

With the addition of cache 114 within memory 104 of computer 100, in addition to the methodology described herein for providing requested information between ACPI system 116, cache 114, and operating system 110, a more efficient system can be achieved. The efficient system can reduce ACPI code run time and increase execution speed with respect to ACPI functions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer system comprising:
   an operating system stored in a main memory;
   an advanced configuration and power interface (ACPI) system in communication with the operating system for receiving an ACPI request from the operating system wherein the ACPI system comprises an ACPI namespace; and
   a cache solely dedicated to storage of ACPI data associated with ACPI requests in communication with the ACPI system for receiving the ACPI request from the ACPI system and for providing ACPI data to the operating system via the ACPI system wherein the ACPI data comprises previously accessed ACPI information from the ACPI namespace.

2. The system of claim 1, wherein the ACPI namespace includes a device tree and a library.

3. The system of claim 1, wherein the ACPI data comprises data from a library within the ACPI namespace.

4. The system of claim 1, wherein the ACPI data comprises intermediate ACPI data that does not vary at run time.

5. The system of claim 1, and further comprising:
   a processor in communication with the operating system for executing at least one program stored within the operating system; and
   at least one input/output device in communication with the processor and the operating system.

6. A method for accessing data within a computer system, the method comprising:
   accessing a cache located separate from an advanced configuration and power interface (ACPI) environment, the cache solely dedicated to storage of ACPI data associated with ACPI requests;
   determining whether requested data associated with an ACPI function call (ACPI data) is located within the cache; and
   providing the requested ACPI data to an operating system via the ACPI environment based upon a determination that the requested data is located within the cache, wherein the operating system is stored in a memory separate from the cache, wherein the requested ACPI data comprises intermediate ACPI data that does not vary at run time.

7. The method of claim 6, wherein the requested ACPI data comprises previously accessed ACPI information from an ACPI namespace.

8. The method of claim 7, wherein the requested ACPI data comprises data from a library within the ACPI namespace.

9. The method of claim 6, and further comprising:
accessing an ACPI namespace;
providing the requested ACPI data from the ACPI namespace based upon a determination that the requested data is not located within the cache; and
storing the requested ACPI data within the cache.

10. A method for accessing information associated with an advanced configuration and power interface (ACPI) environment within a computer system, the method comprising:
accessing a cache located separate from the ACPI environment, the cache having recently accessed information from an ACPI namespace based upon a previous ACPI function call;
searching the cache for requested ACPI information based upon a current ACPI function call; and
providing the requested ACPI information from the cache via the ACPI environment to an operating system stored in a memory separate from the cache in an event of the requested ACPI information being located within the cache, wherein the requested ACPI information located within the cache comprises the recently accessed information from the ACPI namespace.

11. The method of claim 10, wherein the cache includes the recently accessed information from a library within the ACPI namespace.

12. The method of claim 10, and further comprising:
accessing the ACPI namespace;
providing the requested information from the ACPI namespace based upon a determination that the requested information is not located within the cache; and
storing the requested information within the cache.

13. A method of executing a dynamic advanced configuration and power interface (ACPI) function call within a computer system, the method comprising:
receiving an initial ACPI function call from an operating system stored in a main memory;
providing ACPI information from an ACPI namespace based upon the initial ACPI function call to the operating system;
caching the ACPI information within a cache solely dedicated to the storage of ACPI data associated with ACPI requests and located separate from the main memory and separate from an ACPI environment;
receiving a subsequent ACPI function call from the operating system;
determining whether requested ACPI information is located within the cache; and
providing the requested ACPI information from the cache to the operating system via the ACPI environment in an event of the requested ACPI information being located within the cache.

14. The method of claim 13, wherein providing the ACPI information from the ACPI namespace further comprises:
providing the ACPI information from a library within the ACPI namespace.

15. The method of claim 13, and further comprising:
providing the requested ACPI information from the ACPI namespace to the operating system based upon a determination that the requested ACPI information is not located within the cache; and
storing the requested ACPI information within the cache.

16. An advanced configuration and power interface (ACPI) computer system comprising:
a memory comprising:
an operating system; and
an ACPI system in communication with the operating system for receiving an ACPI request from the operating system;
a cache solely dedicated to the storage of ACPI data associated with ACPI requests and located separate from the memory and separate from the ACPI system, the cache in communication with the ACPI system for receiving the ACPI request from the ACPI system and for providing ACPI data to the operating system via the ACPI system, wherein the ACPI data comprises previously accessed ACPI information from an ACPI namespace;
a processor in communication with the memory for executing at least one program stored within the memory;
an input device in communication with the memory and the processor; and
an output device in communication with the memory and the processor.

17. A computer-readable storage medium, wherein the medium is one of electronic, magnetic, or optical, containing instructions for controlling a computer system to perform a method for accessing data within the computer system, the method comprising:
accessing an operating system stored in a memory;
determining an advanced configuration and power interface (ACPI) system in communication with the operating system for receiving an ACPI request from the operating system; and
providing a cache solely dedicated to the storage of ACPI data associated with ACPI requests and located separate from the memory and separate from the ACPI system, the cache in communication with the ACPI system for receiving the ACPI request from the ACPI system and for providing requested ACPI data to the operating system via the ACPI system, wherein, the requested ACPI data comprises intermediate ACPI data that does not vary at run time.

18. The computer-readable storage medium of claim 17, wherein the requested ACPI data comprises previously accessed ACPI information from an ACPI namespace.

19. The method of claim 10, wherein the requested ACPI information located within the cache comprises intermediate ACPI data that does not vary at run time.

20. The method of claim 13, wherein the cached ACPI information comprises intermediate ACPI data that does not vary at run time.

21. The ACPI computer system of claim 16, wherein the ACPI data comprises intermediate ACPI data that does not vary at run time.

22. The computer system of claim 1, wherein the ACPI system aborts the ACPI request from the operating system upon the determination that the ACPI data is located within the cache.

23. The method of claim 6, and further comprising:
aborting the ACPI function call upon the determination that the requested ACPI data is located within the cache.

24. The method of claim 13, and further comprising:
aborting the subsequent ACPI function call in the event of the requested ACPI information being located within the cache.

* * * * *